June 14, 1949.  H. C. McKINNEY  2,473,165
THREE-WAY VEGETABLE SLICER
Filed Dec. 26, 1947  2 Sheets-Sheet 2

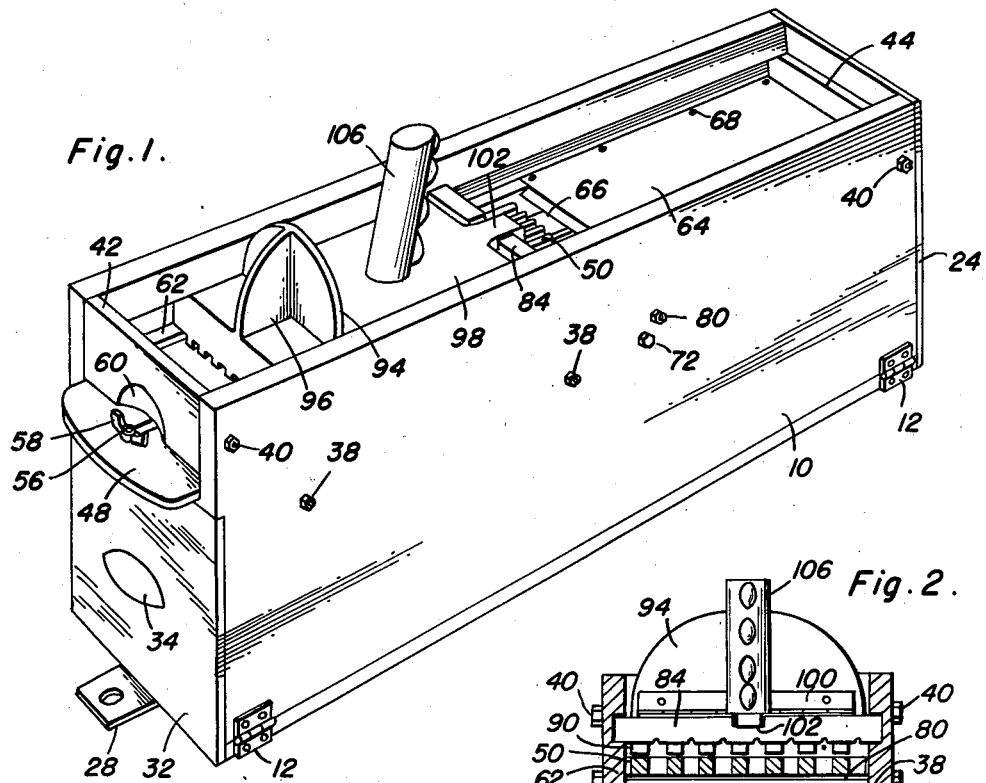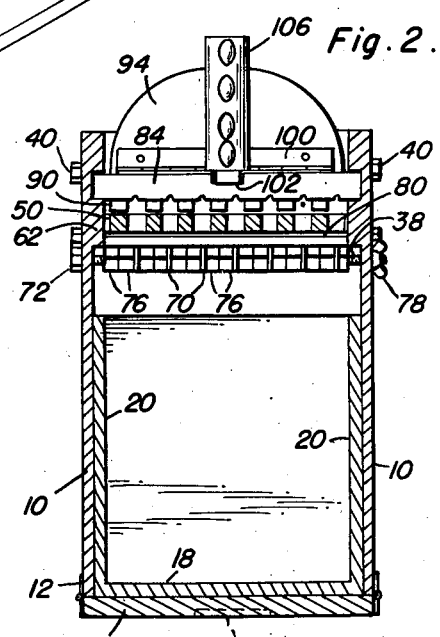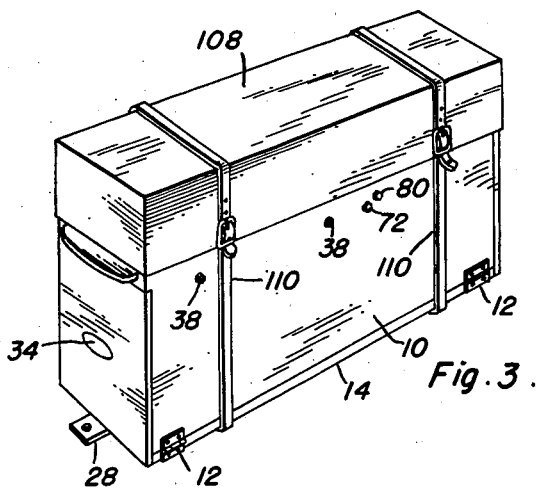

Horace C. McKinney
INVENTOR.

BY
Clarence A. O'Brien
and Harvey B. Jacobson
Attorneys

Patented June 14, 1949

2,473,165

UNITED STATES PATENT OFFICE 2,473,165

THREE-WAY VEGETABLE SLICER

Horace C. McKinney, Rocksprings, Tex., assignor of one-half to Evelyn R. Minter, Rocksprings, Tex.

Application December 26, 1947, Serial No. 793,795

1 Claim. (Cl. 146—78)

This invention relates generally to food slicers and more particularly to a food slicer capable of slicing food in more than one manner, the device being operated manually.

A primary object of this invention is to provide a food slicer which can be used to slice potatoes, other vegetables and fruits and the like, the pattern of the slices being either plain or elongated strips, and the device being also capable of cubing the food.

Another object of this invention is to provide a food slicer which is suitable for use in certain commercial establishments as well as in homes, the food slicer designed for domestic use being usually smaller than the device used in commercial establishments but otherwise similarly constructed.

Still another object of this invention is to provide a food slicer which can be readily knocked down or disassembled, either partially or wholly, to facilitate cleaning of the same, as well as to facilitate transportation and storage of the device.

Still another object of this invention is to provide in the food slicer means for conveniently changing the pattern of the slices cut thereby.

Yet another object of this invention is to provide a food slicer in which compartments are incorporated in the casing of the device for reception of the sliced material and for storage of either sliced or unsliced material.

And a last object to be specifically mentioned is to provide a food slicer which is relatively inexpensive and practicable to manufacture, which is extremely simple and convenient as well as safe to use, and which will give generally efficient and durable service.

With these objects definitely in view, together with other objects inherent in the structure of the device which will become apparent as the description proceeds, this invention resides in certain novel features of construction, combination and arrangement of parts and portions as will be described in the specification, particularly pointed out in the appended claim, and illustrated in the accompanying drawings which form a material part of this application, and in which:

Figure 1 is a perspective view of the assembled food slicer, with the cover removed;

Figure 2 is a vertical transverse sectional view of the food slicer, taken on line 2—2 in Figure 4, and in the direction of the arrows;

Figure 3 is a perspective view of the food slicer with the cover secured thereon;

Similar characters of reference designate similar or identical parts and portions throughout the specification and throughout the several views of the drawings.

Figure 4:
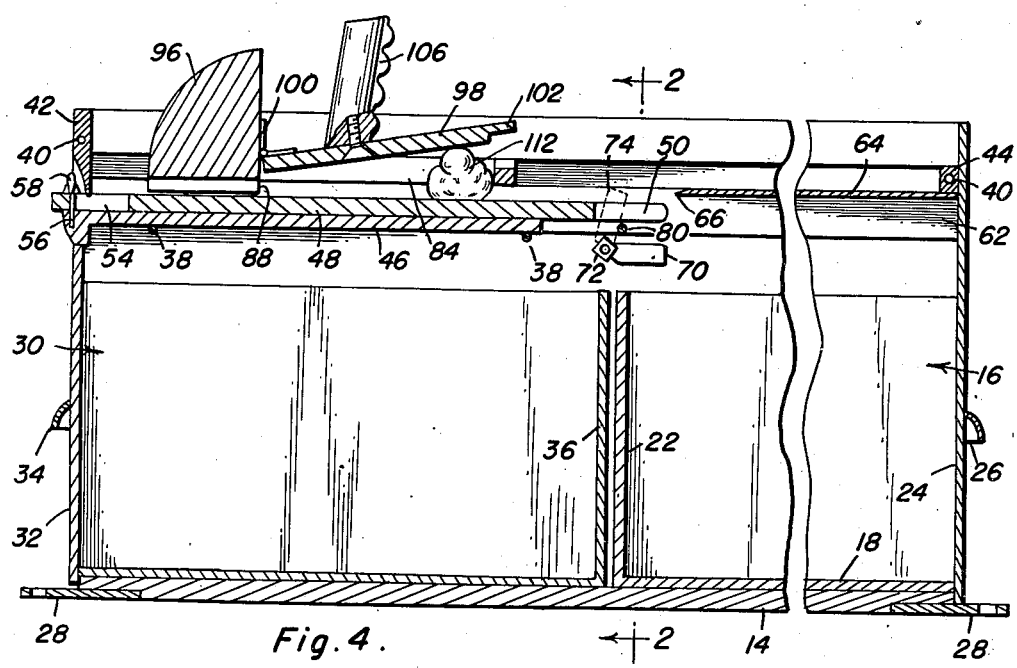
Figure 4 is a longitudinal vertical sectional view of the food slicer, the section being taken substantially on a longitudinal center line of the device.

Referring now to the drawings in detail, this food slicer comprises a box-like casing in which the sides 10 are hinged, as at 12, to the base 14. A box-like receptacle 16 for sliced food is removably and slidably associated with one end of the device, this receptacle comprising a base board 18, side panels 20, an inner end panel 22 and an outer end panel 24 which may extend upwardly to the level of the tops of the sides 10 of the casing. A hand-grip 26 is secured to the panel 24 to facilitate the manipulation of the receptacle, and in this connection it may be noted that the base 14 of the casing may be provided with flat brackets 28 which are apertured to receive screws or other fastening devices when it is desired to securely mount the slicer upon a table or the like.

At the other end of the casing a storage bin, generally indicated by the numeral 30, and of construction similar to the construction of the receptacle 16, is similarly mounted. The outer end panel 32 of this storage bin is provided with a hand-grip 34 and the inner end panel 36 will ordinarily abut the inner end panel 22 of the receptacle 16.

The sides 10 of the casing are held together by bolts disposed transversely of the casing, as at 38 and 40, the bolts 40 being inserted through transversely disposed spacer blocks 42 and 44 positioned near the top of the casing and at either end thereof.

A flat plate 46 is clipped between the sides 10 of the casing and supported on top of the transverse bolts 38 and extends from one end of the casing approximately one-half of the length thereof. A table 48, slightly longer than the plate 46, is mounted for longitudinal sliding adjustment on the top of the plate 46 and this table has a plurality of regularly spaced teeth 50 with slots 52 between the teeth at one end of the table, while the other end of the table which is disposed toward the left in the drawings is slotted as at 54 to receive an adjusting screw 56 which cooperates with a wing nut 58 for adjustably fixing the table to the end of the plate 46, the adjusting screw 56 being threadedly associated with the outer end portion of this plate. It is preferred that the block 42 should be recessed as at 60 adjacent the wing nut 58, the outer end of the table 48 projects slightly beyond the end of the casing so that the same may be grasped by hand for adjusting the table. A pair of laterally disposed longitudinal rails 62 extend throughout the length of the casing on each side of the table 48 and a knife 64, of plate character and having a cutting edge 66, is disposed transversely of the casing and adjacent one end of the table 48 is rigidly secured to the adjacent portion of the rails 62, as by screws 68 or in any other suitable manner, the level of the knife edge 66 being slightly above the level of the table, as best shown in Figure 4. A cutter having a plurality of blades 70 secured in regularly spaced relation along a cutter supporting bolt 72 is adjustably mounted on the casing so that the blade 70 may be disposed between the teeth 50 on the inner end of the table 48 when this multiple cutter is in one position, as indicated by the dash lines 74 in Figure 4. One suitable method of constructing the multiple cutter is illustrated in Figure 2, wherein it is represented that the bolt is headed at one end and is threaded substantially throughout the entire length, to receive pairs of nuts 76, while the blades 70 are rigidly secured on this bolt 72 and between the pairs of nuts, all of the blades being orientated in the same direction, and the one end of the bolt 72 may be provided with a wing nut 78 whereby the cutter may be rotated manually when the table 48 is withdrawn as to the left in Figures 1 and 4. A transverse bolt 80 is secured terminally to the casing and positioned to limit the movement of the cutter in one direction, that is, to hold the cutter in operative position as indicated in the dash line position 74 in Figure 4.

Figure 5:
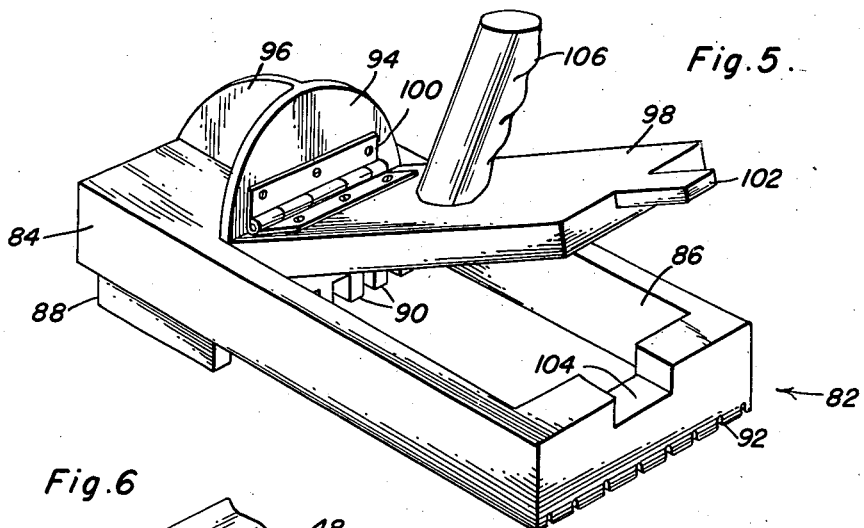
Figure 5 is a perspective view of the carrier which is slidably mounted in the casing of the device; and, Figure 6 is a fragmentary enlarged detailed view, in perspective, of one end of the table upon which the food to be sliced is placed.
Figure 6:
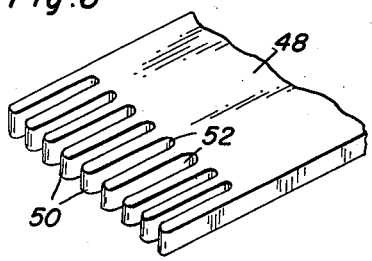

A carrier, generally indicated by the numeral 82 and represented as withdrawn from the remainder of the device in Figure 5, is comprised of a rectangular block 84 having a large vertically disposed aperture 86 and a depending runner 88 adapted to slide between the rails 62 while the lower surface of the block 84 which is slightly wider than the runner 88 slides upon the upper surfaces of these rails. The runner 88 will be formed with a plurality of depending ribs 90 and the front portion of the block will be toothed as at 92. The upper portion of the block 84 is formed with a transversely disposed upright 94 which is combined with a brace member 96 adapted to also serve as a hand-grip for the carrier. A press plate 98 is secured by hinges 100 to the upright 94 so tthat this press plate can be depressed into the vertical recess 86 in the block, the downward movement of the press plate being limited by a lug 102 adapted to engage in a slot 104 in the adjacent portion of the block 84. To facilitate the manipulation of the press plate 98, a handle 106 is rigidly secured to the upper surface thereof.

A box-shaped cover 108 is provided for enclosing the upper portion of the casing and this cover is held in place when the device is not in use by encircling straps 110, as will be well understood from inspection of Figure 3.

The operation of this invention will be clearly understood from the foregoing description of the mechanical details thereof taken in connection with the above recitation of the objects sought to be achieved by this invention. In recapitulation, it may be added that the food, represented by a potato 112, is placed in the recess 86 in the carrier and the press plate 98 is pressed down to hold the food in place. If it is desired to provide only plain flat slices, the cutter is turned into the position shown in full lines in Figure 4 and the carrier is reciprocated back and forth so that the knife 64 will cut the food into slices which fall into the receptacle 16. If it is desired to cut the food into narrow strips, the cutter is placed ino the dash line position in Figure 4 and the carrier again operated in the same manner. Finally, if it is desired to cube the food, the carrier is moved so that a partial slicing of the food is accomplished, whereafter the food such as the potato 112 is turned through 90 degrees and the carrier again reciprocated. In this way, each side of the potato may be cubed.

Many minor variations may be made in the invention without departure from the spirit and scope thereof and this invention should be limited only in accordance with the proper interpretation of the terminology used in the subjoined claim.

Having described the invention, what is claimed as new is:

A food slicer comprising an elongated box-like casing open at the top, a carrier longitudinally slidably mounted in an upper portion of the casing, a table mounted on the casing immediately beneath said carrier, a transversely disposed knife secured to the casing intermediate the ends of the casing and slightly above the level of the table, and a multiple bladed cutter mounted on said casing and disposed adjacent to and parallel with said knife, said cutter being rotatable into operative and inoperative positions, a transverse bolt positioned on the casing to limit rotation of the cutter in one direction, said table being slotted to receive blades of the multiple bladed cutter when said cutter is in operative position, said table being slidable in one direction longitudinally of the casing to hold the cutter in operative position and in engagement with said transverse bolt and slidable in the opposite direction to allow rotation of the cutter into inoperative position, means to fasten said table in either position, said table being also slidable in said one direction when the cutter is in inoperative position to provide support for vegetables being processed immediately in front of said knife, and said carrier having a plurality of depending ribs adapted to slide between said blades when the carrier is moved in one direction.

HORACE C. McKINNEY.

REFERENCES CITED

The following references are of record in the file of this patent:

UNITED STATES PATENTS

| Number | Name | Date |
|---|---|---|
| 113,188 | Monnet | Mar. 28, 1871 |
| 293,300 | Barth et al. | Feb. 12, 1884 |
| 548,145 | Summers | Oct. 15, 1895 |
| 653,385 | Howell et al. | July 10, 1900 |
| 2,237,955 | Arnt | Apr. 8, 1941 |

FOREIGN PATENTS

| Number | Country | Date |
|---|---|---|
| 468,118 | Great Britain | May 26, 1938 |